United States Patent [19]

Nakata et al.

[11] 4,088,838
[45] May 9, 1978

[54] VOICE RESPONSE SYSTEM

[75] Inventors: Kazuo Nakata, Kodaira; Akira Ichikawa, Kokubunji; Akio Suehiro, Yokohama, all of Japan

[73] Assignee: Hitachi, Ltd., Japan

[21] Appl. No.: 751,985

[22] Filed: Dec. 20, 1976

[30] Foreign Application Priority Data

Jan. 14, 1976  Japan ..................................... 51-2803

[51] Int. Cl.$^2$ ........................................... H04M 11/00
[52] U.S. Cl. ............................... 179/2 A; 179/84 VF
[58] Field of Search ................... 179/2 R, 2 A, 1 SM, 179/84 VF, 2 DP, 2 CA; 340/148, 151, 152 R, 153, 154; 235/181

[56]  References Cited

U.S. PATENT DOCUMENTS

| 3,647,972 | 3/1972 | Glover | 179/2 DP |
| 3,647,973 | 3/1972 | James | 179/2 DP |
| 3,882,283 | 5/1975 | Prowdfoot | 179/84 VF |

*Primary Examiner*—Kathleen H. Claffy
*Assistant Examiner*—Joseph A. Popek
*Attorney, Agent, or Firm*—Craig & Antonelli

[57]  ABSTRACT

Improvements in a push button signal receiving device for use in a voice response system, wherein in order to permit a push button signal from a user's telephone terminal to be received even during the period when a responding voice signal is being transmitted through the system, an analyzer for the parameter analysis of the responding voice signal and an inverse filter responsive to the analyzer for flattening the spectrum of the responding voice signal which is mixed into the push button signal are provided, whereby the influence of the responding voice signal mixing into the signal to be applied to a push button signal detector is erased, and the push button signal, which may be feeble in comparison to the responding voice signal, is detected and recognized nevertheless.

15 Claims, 8 Drawing Figures

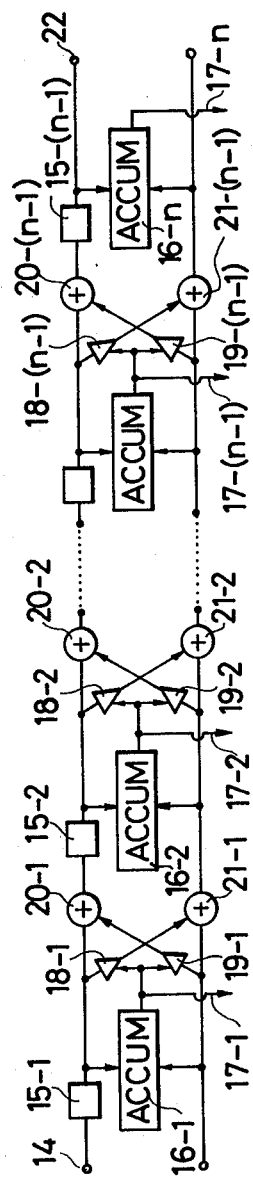
FIG. 3
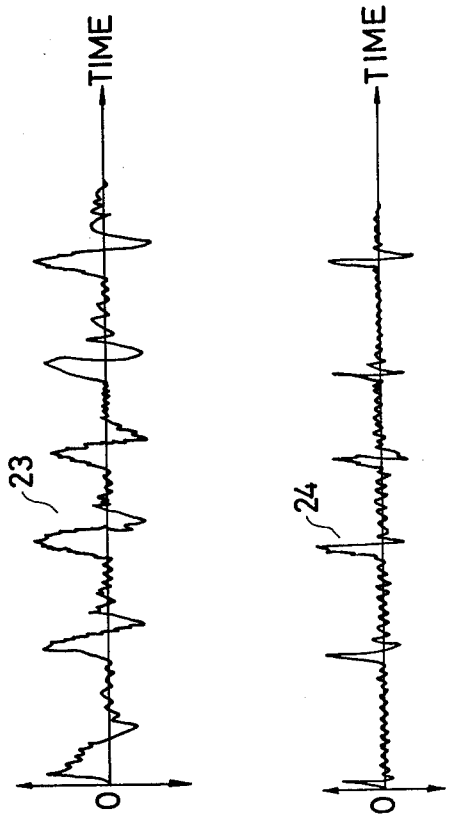
FIG. 4A
FIG. 4B

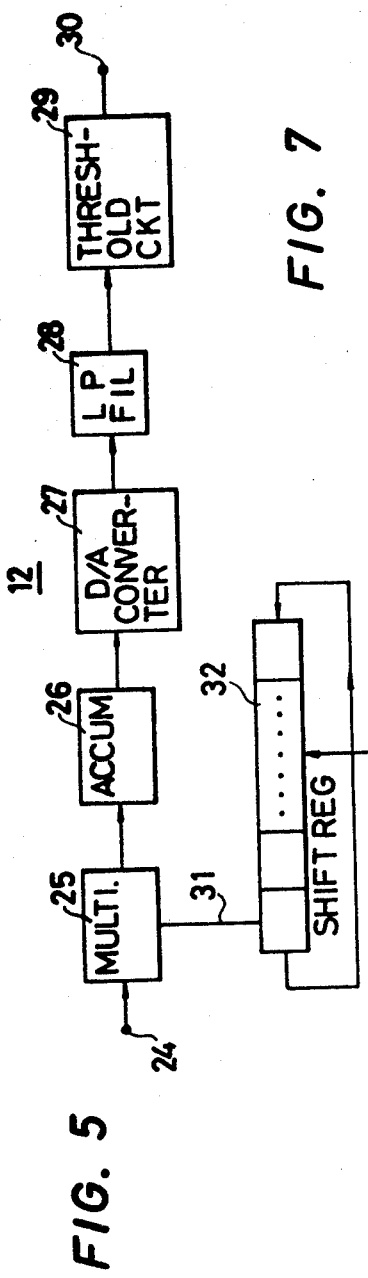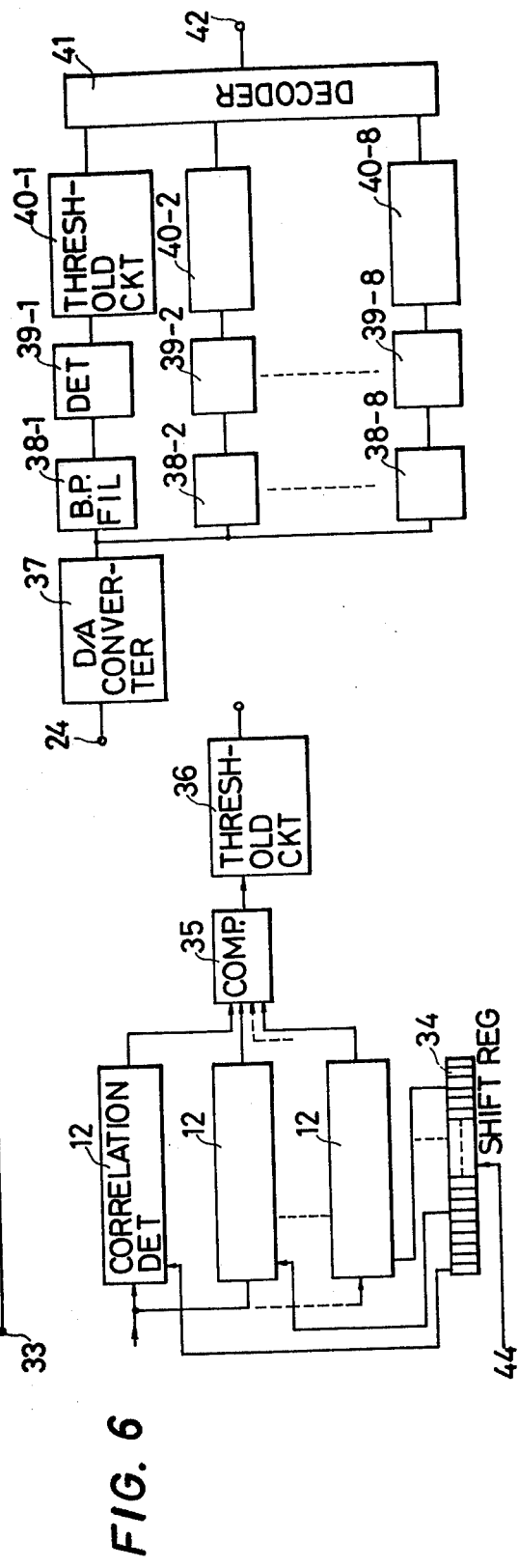

VOICE RESPONSE SYSTEM

BACKGROUND OF THE INVENTION

1. Field of the Invention

This invention relates to a voice response system, and more particularly to a push button signal receiving device for use in a voice response system.

2. Description of the Prior Art

In general, a voice response system comprises a plurality of push button telephone terminals, a push button signal receiver which receives information formed of a push button signal (hereinbelow called "PB signal") from the telephone terminal, a central information processor (for example, a computer) which is driven by an output of the receiver, and a voice response unit which converts into voice a response sentence formed by the information processor and which transmits the response voice to the questioner's telephone terminal. Such voice response systems are typically used as in a seat reservation system of a passenger carrier, a stock quote system, etc.

Unlike signals made up of dial impulses, as used in conventional dial telephones, PB signals are composed of combinations of any two of four kinds of sine waves which are previously determined in each of two higher and lower regions of a voice frequency band. They are allotted to represent numerals and some special symbols. However, PB signals lie within the same signal frequency band as that of voice signals, and therefore, both these types of signals can coexist within the system, which sometimes creates a problem.

Like a PB signal receiver as used in an ordinary telephone exchange, a PB signal receiver employed in prior art voice response systems is so constructed that, in order to prevent a malfunction in the receiving of the PB signal resulting from confusion with the voice signal, the received PB signal is checked when a signal is received whose energy is distributed in a wide frequency band similar to a voice signal. On the other hand, in a system which is designed for effecting seat reservations employing a voice response system, and in which the desired purpose is achieved by the repetition of a push button input by a user and a response or instruction by the voice response unit, it is desirable to cut off the response voice when it becomes unwanted because it provides information already known or when it is desired to receive the next information with a push button request in the course of the response voice transmission, and thus shorten the required time of use of the whole system. With the prior art PB receiver, however, such objects cannot be accomplished.

SUMMARY OF THE INVENTION

The principal object of this invention is to provide means for cutting short the time of transmission of a response voice, thereby enabling one to effectively use a voice response system in a more desirable and efficient manner.

Another object of this invention is to provide a PB signal receiver which can receive input information from a user and enter them into a central information processor even during the period when a response voice is being transmitted.

Still another object of this invention is to provide a PB signal receiver for a voice response system which can accurately detect a feeble PB signal within the presence of a greatly influential response voice signal leaking into a PB signal receiving unit.

In order to accomplish these objects, this invention provides a PB signal receiver for a voice response system which is capable of discriminating between the voice response signal and the PB signal. At an input part of a PB signal receiving unit which receives an input PB signal and which converts the information, such as a numeral, represented by the PB signal into another code signal, a filter for flattening the spectrum of a response voice is provided in order to erase the influence of the response voice signal mixed in the PB signal.

More specifically, the voice response system of this invention includes a PB signal receiving part comprising a directional coupler which conducts a response voice to a user's channel and also conducts a PB signal from the user's channel to a signal detector, an analyzer which analyzes a parameter of the response voice, a filter which is driven by an output of the analyzer to which the PB signal from the directional coupler is applied and which flattens the spectrum of the response voice contained in the PB signal, the above-mentioned signal detector which detects an information signal represented by the PB signal from an output of the filter, and means for cutting off the output of the voice response system when the presence of the PB signal has been detected by the detector.

In accordance with the voice response system of this invention, when a user depresses a push button in the presence of the response voice, the receiving part of the voice response system detects accurately the feeble PB signal arriving from a distant place and puts it into a central information processor in spite of the existence of the greatly influential leaked signal of the response voice. Among the response voices, there are included an announcement for the confirmation of the preceding input information, the instruction of the kind of information for the succeeding input, etc.

In the case where the user is skilled in the use of the system, he can judge the information for the next input without hearing all of the response voice message. By depressing the corresponding push button, therefore, the central information processor can be requested to interrupt operation of the voice synthesizer during the period when the response voice is being transmitted. It is accordingly possible to remarkably shorten the time of use of the whole system.

The above-mentioned objects and features of this invention and other objects and features thereof will become more apparent from the following description when taken in conjunction with the accompanying drawings.

BRIEF DESCRIPTION OF THE DRAWINGS

FIG. 3 is a circuit diagram of an embodiment of an analyzer as provided in FIG. 2;

FIGS. 4A and 4B show the waveform of an input signal of the analyzer and the waveform of an output signal thereof, respectively; and FIGS. 5, 6, and 7 are block diagrams each showing the construction of an embodiment of a correlation detector as provided in FIG. 2.

DESCRIPTION OF THE PREFERRED EMBODIMENTS

Figure 1:
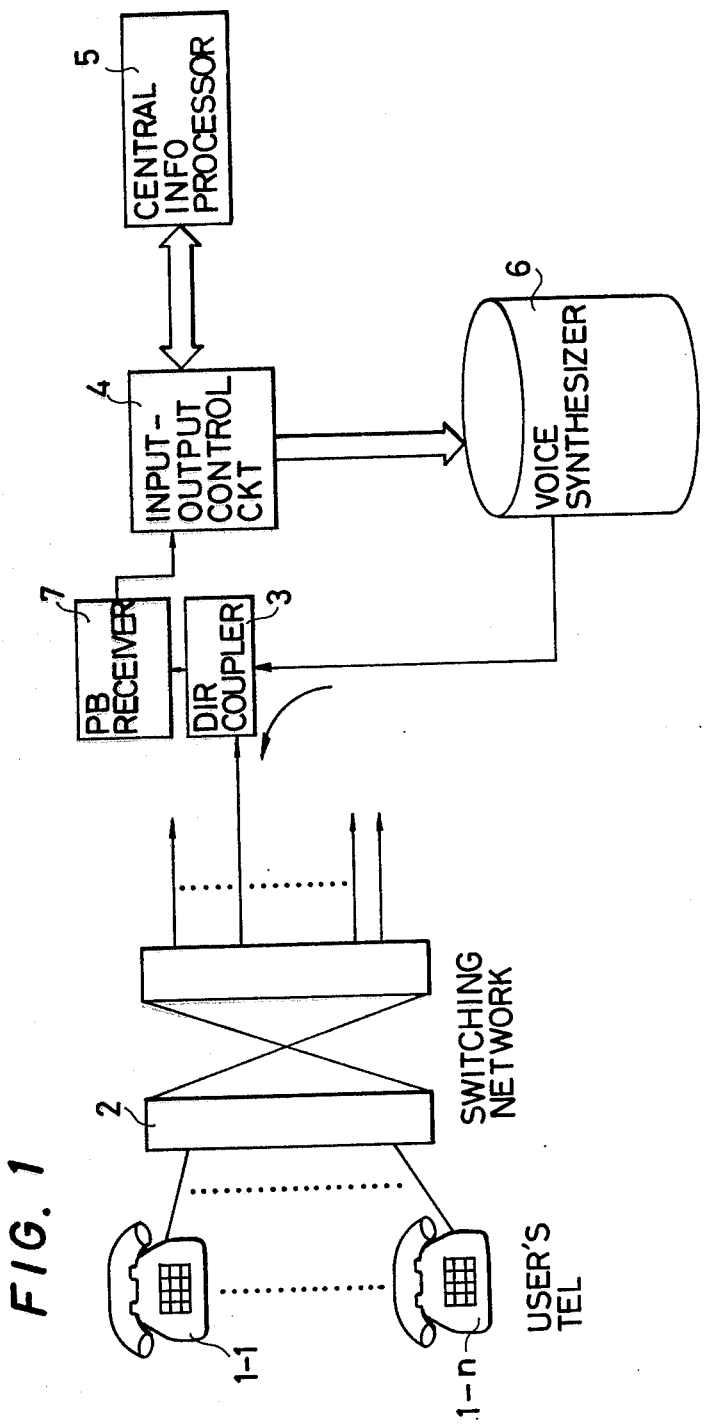
FIG. 1 is a block diagram showing the general construction of a voice response system to which this invention is applied.

The general construction of a voice response system to which this invention is applied is shown in FIG. 1.

Referring to the figure, a call and input information from one of a plurality of user's push button telephones 1—1 through 1-n are received by a PB receiver 7 via a switching network 2 and a directional coupler 3. The information provided by the PB signals is detected and fed to a central information processor 5 via an input-output control circuit 4. Depending on the contents of the input information successively received, the central information processor 5 prepares output information on the confirmation of the input information, the sort of input information to be entered next or an answer to a question, and puts this output information into sentences. The sentences are fed to a voice synthesizer 6 via the input-output control circuit 4, and are converted into voice signals therein. The synthesized voice signals are transmitted to the user's telephone via the directional coupler 3 and switching network 2.

While the ensuing explanation will be made of a single user's channel for the sake of brevity, the actual system carries out a time-division multiplex processing as to signals of a plurality of channels to be digitally processed under control of the central processor 5.

This invention pertains particularly to a portion of the PB signal receiver 7 and to the input-output control circuit 4, and is so constructed that the PB signal can be received even during the period when the responding voice from the voice synthesizer 6 is being transmitted to the user's telephone via the directional coupler 3. If necessary, the input-output control circuit 4 may halt the operation of the voice synthesizer 6 upon reception of the signal.

Figure 2:
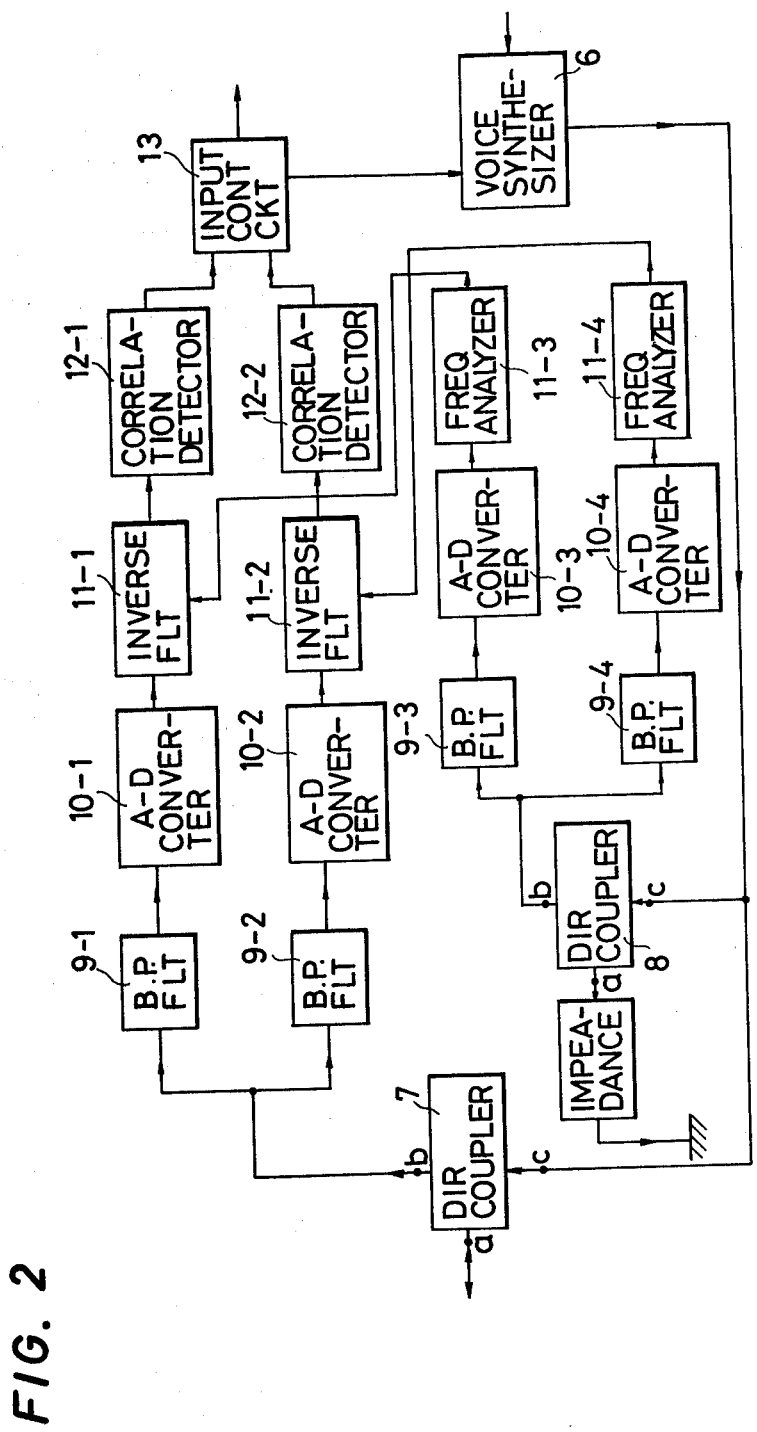
FIG. 2 is a block diagram showing the construction of an embodiment of a PB signal receiving part which is the essential portion of this invention.

FIG. 2 is a block diagram showing the construction of an embodiment of the PB signal receiving circuit which constitutes the essential portion of this invention.

The responding voice from the voice synthesizer 6 is coupled to a transmission line $a$ of the user's channel through an input terminal $c$ of the directional coupler 3, which may be provided as a hybrid coil. The PB signal applied from the terminal $a$ appears only at a terminal $b$ owing to the function of the directional coupler 3. In this case, ideally, if the impedance of the channel is equal to the design impedance of the hybrid coil, the response voice delivered to the input terminal $c$ will appear only at the terminal $a$ and will not appear at the terminal $b$. In actuality, however, the impedances are not equal to each other, the voice signal from the voice synthesizer being relatively intense; whereas, the signal from the user's telephone becomes feeble, since it is transmitted from a distant place. Accordingly, the response voice signal leaking into the terminal $b$ cannot be ignored.

The signals at the terminal $b$ are fed to band-pass filters 9-1 and 9-2. The passing frequency ranges of these filters are designed so as to fully cover lower frequencies and higher frequencies constituting the PB signal, respectively. In the case where outputs of the filters are analog signals, they are respectively applied to analog-to-digital converters 10-1 and 10-2 and converted into digital signals so as to allow the subsequent processing thereof to be digitally performed. By way of example, sampling is carried out at 10 KHz, and one sample is coded by ten and odd bits. The outputs of the converters are applied to filters 11-1 and 11-2, which constitute the essential portion of this invention. As will be described in detail later, these filters serve to remove the response voice components contained in the input signals.

The outputs of the filters 11-1 and 11-2 are respectively applied to correlation detectors 12-1 and 12-2. Each of the correlation detectors detects the frequency of the input signal by finding the correlation of the input signal, and delivers a signal corresponding to the detected frequency to an input control circuit 13. Here, what the PB signal is, i.e., whether a button depressed by the user indicates a numeral or a symbol, is discriminated on the basis of the combination between the output signals of the detectors 12-1 and 12-2. An output of the input control circuit 13 inhibits the output of the voice synthesizer 6, and is also delivered to the central information processor 5 and is subjected to further processing thereby.

On the other hand, the response voice signal is also fed to an input terminal $c$ of a second directional coupler 8 which has the same characteristics as that of the first directional coupler 7. Most of the response voice having passed through the second directional coupler 8 appears at an output terminal $a$. The terminal $a$ is terminated by an impedance which is substantially equal to the impedance of the terminal $a$ of the first directional coupler 7. Thus, the second directional coupler 8 is constructed so as to become as close to the real channel connection as possible. At a second output terminal $b$ of the second directional coupler 8, accordingly, there appears the same leaky response voice component as that appearing at the output terminal $b$ of the first directional coupler 7. The signal from the terminal $b$ of coupler 8 is applied to band-pass filters 9-3 and 9-4 and analog-to-digital converters 10-3 and 10-4 in sequence. These band-pass filters and converters have the same characteristics and functions as the aformentioned band-pass filters 9-1, 9-2 and converters 10-1, 10-2, respectively. They are provided so that the response voice components in the inputs of the inverse filters 11-1 and 11-2 and the input signals of parameter analyzers 11-3 and 11-4 may become equal.

FIG. 3 is a circuit diagram showing the construction of an embodiment of the parameter analyzers 11-3 and 11-4 in FIG. 2. The analyzer is also termed a "PAR COR analyzer."

The digital signal from the analog-to-digital converter 10-3 or 10-4 in FIG. 2 is applied to input terminals 14 and 14' of the parameter analyzer. The input signal is applied to a delay memory 15-1 which has a delay time equal to one sampling period. A part of the output from the delay memory 15-1 and the input signal are applied to a correlation circuit 16-1. The degree of correlation $k_1$ (hereinbelow, termed the "correlation coefficient" or "$k$-parameter") between the delayed signal component and the signal component at the present time is obtained in the correlation circuit 16-1, and is delivered to a terminal 17-1. Multipliers 18-1 and 19-1 perform multiplication between the output of the delay memory and the correlation coefficient $k$ and the multiplication between the signal at the present time and the correlation coefficient $k$, respectively. Adders 20-1 and 21-1 add the output of the delay memory 15-1 and the output of the multiplier 19-1 and add the signal at the present time and the output of the multiplier 18-1, respectively. A plurality of ($n$) stages of such unit circuit of the above arrangement are connected in series.

Accordingly, letting $\{x_i\}$ denote one input of the adder 20-$i$ at the $i$-th stage of the upper signal series (the output of the delay circuit 15-$i$ at the $i$-th stage), $\{k_i\}$ denote the correlation coefficient of the $i$-th stage and $\{y_i\}$ the input of the adder 21-$i$ at the $i$-th stage of the lower signal series, $$\begin{cases} x_{i+1} = x_i - k_i y_i \\ y_{i+1} = y_i - k_i x_i \end{cases}$$

For example, $y_1$ and $y_2$ represent the signals at the terminal 14 and at the output of adder 21-1, respectively.

The construction of the inverse filters 11-1 and 11-2 in FIG. 2 is similar to that of the parameter analyzers 11-3 and 11-4, but the correlation circuits 16-1, ..., 16-$n$ are removed in FIG. 3 and the output lines of the parameter analyzers providing the correlation coefficients $k$ as indicated at 17-1, ..., 17-($n$-1) in FIG. 3 are respectively connected to the multipliers 18-1, 19-1; ...; 18-($n$−1), 19-($n$−1) in the inverse filters 11-1 and 11-2. The output of the inverse filter is derived from an upper output terminal 22.

The number of stages of the unit circuits in FIG. 3 constituting the parameter analyzers 11-3 and 11-4 and the inverse filters 11-1 and 11-2 which are used in the PB signal receiving part in FIG. 2 may be 4–6 stages for the lower frequencies of the PB signal and 2–4 stages for the higher frequencies thereof.

The parameter analyzers 11-3 and 11-4, as shown in FIG. 3, identify the pole of the input signal (determine the frequency and the band width) on the assumptuion that the spectrum of the input signal is of the all-pole type. The inverse filters 11-1 and 11-2, which receive the externally applied coefficients, are the inverse circuits of the analyzers 11-3 and 11-4, and have characteristics of all-zero circuits. Accordingly, the outputs of the inverse filters 11-1 and 11-2 have average frequency characteristics as to the response voices. In fact, they become either a train of impulses with intervals corresponding to the pitch periods of the voice or white random noise.

The PB signal is not contained in the output at the terminal $b$ of the second directional coupler 8 at any time. Therefore, the inverse filters 11-1 and 11-2 have the function of flattening the frequency spectrum as to only the response voice signal, and they have no influence on the spectrum of the PB signal. Accordingly, the outputs of the filters 11-1 and 11-2 in the presence of the PB signal become such a signal that a sine wave signal having a predetermined frequency equivalent to the PB signal is superposed on the impulse train or the white random noise.

The input PB signal can accordingly be detected by taking the self-correlation or the cross-correlation between a PB signal prepared in advance and the sine wave of the input by the correlation detectors 12-1 and 12-2. Such relations are illustrated in FIGS. 4A and 4B.

FIG. 4A shows the input signal wave 23 of the inverse filter 11 in FIG. 2. It is such that the feeble PB signal is superposed on the leaky response voice signal. FIG. 4B shows the output wave-form of the inverse filter 11-1 or 11-2. It is such that the feeble PB signal is superposed on the voice source impulse train. Although the analog waveforms are given in the illustration, the actual processing is made in the form of digital signals.

FIG. 5 is a block diagram showing the construction of the correlation detector 12. It detects the presence of the PB signal from the output signal wave of the inverse filter, as shown in FIG. 4B, by detecting the cross-correlation coefficient by exploiting the fact that the frequency of the PB signal is known in advance.

Referring to FIG. 5, the input signal shown in FIG. 4B is applied to an input terminal 24 of a multiplier 25. On the other hand, a shift register 32 stores therein sample signals corresponding to one cycle of the various reference sine wave signals for detection, and the sample signals of the reference sine wave are sequentially applied to the multiplier 25 from a line 31 by read-out driving pulses which are impressed on a clock input terminal 33. Thus, the sample signal and the input PB signal are multiplied. The read-out period of the shift register is equal to the sampling period.

Outputs from the multiplier 25 are accumulated by an accumulator 26, and the resultant value is converted into an analog signal by a digital-to-analog converter 27. A direct current component is detected from the analog signal by a low-pass filter 28, and is applied to a threshold circuit 29. The threshold circuit 29 detects the presence of the direct current component by comparing a predetermined threshold value with the direct current component.

These can be expressed by equations as follows:

Input waveform: $A \cos(\omega t + \theta)$
Signal waveform: $A_o \cos(\omega_o t)$
Correlation output:

$$\zeta(t) = \frac{1}{T} \int_0^T A \cos(\omega t + \Theta) A_o \cos(\omega_o t) \, dt$$

$$= \frac{1}{T} \int_0^T \frac{A A_o}{2} \cos(\Delta\omega t + \Theta) \, dt$$

$$+ \frac{1}{T} \int_0^T \frac{A A_o}{2} \cos\{(\omega + \omega_o) t + \Theta\} \, dt$$

Low frequency output:

$$\overline{\zeta(T)} = \frac{1}{T} \int_0^T \frac{A A_o}{2} \cos(\Delta\omega t + \theta) \, dt$$

This output becomes the maximum at $\Delta\omega = \omega - \omega_o = 0$:

$$\overline{\zeta(T)}\big|_{\Delta\omega=0} = \frac{A A_o}{2} \cos \theta$$

This value becomes a maximum at 74 →0, and the maximum value is $A A_o/2$. The control of $\theta$ can approximately be made to determine which sample value of the sample value shift register is started for read-out. The variable range of the control is $10 \times 10\ 10 \times 10^3/650 \approx 15$ (15 kinds) in assuming that the lowest frequency of the PB signal is 650 Hz and that the sampling period is 10 KHz.

When, in actuality, four points are set at equal intervals in the varying range ($\theta = 0 - 2\pi$), the ratio to the maximum value becomes:

$$\cos(\pi/4)/\cos 0 \approx 1/\sqrt{2}$$

That is, the maximum value can be detected in a range of 3 dB.

To this end, an expedient as illustrated in FIG. 6 may be adopted. Four of the correlation detectors 12 in FIG. 5 are arranged in parallel. The signals with their phases shifted every $\pi/2$ are fed from a shift register 34 to the respective correlation detectors, to calculate the correlations. The outputs are compared by a comparator 35. Finally, the maximum value among them is delivered as an output.

By providing a buffer register halfway between the input and the calculation, the time-division multiplex processing can also be conducted with a single correlation unit.

Whether or not the above maximum value exceeds a predetermined threshold level may be judged with a threshold circuit 36. Of course, it is also possible to provide the threshold circuit 36 in the correlation detector 12 and to provide an OR circuit instead of the comparator 35.

FIG. 7 shows another circuit arrangement whose function is equivalent to that of the correlation detector.

The PB signal received at the input terminal 24 is applied to a digital-to-analog converter 37, and is converted into an analog signal. The analog signal is applied in parallel, to a plurality of band-pass filters 38-1, ..., 38-8 which have different center frequencies. Detectors 39-1, ..., 39-8 and threshold circuits 40-1, ..., 40-8 are connected in series, respectively. Outputs from the band-pass filters are detected by the corresponding detectors, and whether or not they exceed threshold levels are discriminated by the corresponding threshold circuits. If any of the threshold circuits 40-1, ..., 40-8 provides an output, it indicates that a frequency component corresponding to the particular circuit exists. On the basis of the combination of the circuits providing such frequency components, a decoder circuit 41 prepares a code signal corresponding to information represented by the PB signal. The code signal is sent from an output terminal 42 to the information processor.

In the above, only one channel has been described for the sake of brevity. Needless to say, however, a large number of channels can be simultaneously processed in such a way that the portion of the frequency analyzers and inverse filters is put into the time-division multiplexing by adding a buffer memory for rendering the operation of the apparatus highly speedy and for storing intermediate results.

In the PB signal receiving part of the voice response system according to this invention, it is considered that the voice signal is subtracted on the basis of spectral characteristics owing to mean values over a time (about 20-30 ms), not that the voice signal is removed on the basis of the subtraction between instantaneous waveforms. Owing to the mean values over the time, an erasure on the whole is possible. Moreover, the erasure is not considerably susceptible to changes in the phase characteristic and the amplitude of voice (is not considerably influenced by the changes).

As set forth above, according to this invention, the push button signal coexisting with the voice response output is detected and discriminated, and an interrupt function is applied to the control of the voice response system, whereby the whole system can be more effectively utilized.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of skill in the art.

What is claimed is:

1. A voice response system including at least one push button telephone terminal at which push button signals may be selectively generated; push button receiver means for detecting said push button signals; control means for decoding said detected push button signals; voice synthesizer means for transmitting response voice signals to said push button telephone terminal in response to said control means; interconnecting means including a first directional coupler for interconnecting said telephone terminal with said receiver means and said voice synthesizer means; and analyzer means responsive to the output of said voice synthesizer means for analyzing a parameter of said response voice signals; said push button receiver means including inverse filter means controlled by the output of said analyzer means and connected to receive said push button signals from said directional coupler for flattening the spectrum of any response voice signals which may have been mixed with said push button signals in said directional coupler, and correlation detector means for detecting push button signals in the output from said inverse filter means.

2. A voice response system as defined in claim 1, further including means responsive to an output from said correlation detector means for inhibiting operation of said voice synthesizer means.

3. A voice response system as defined in claim 2, wherein said directional coupler has a transmit terminal for delivering a response voice signal to said telephone terminal and for receiving a push button signal from said telephone terminal, a response voice input terminal, and a push button signal output terminal.

4. A voice response system as defined in claim 3, further including a second directional coupler having the same characteristics as the first directional coupler forming part of said interconnecting means, said second directional coupler having a response voice input terminal connected to the output of said voice synthesizer means, a transmit terminal connected to a terminating circuit having the same impedance as the transmit terminal side of said first directional coupler, and an output terminal connected to said analyzer means.

5. A voice response system as defined in claim 4, wherein said first and second directional couplers each comprise a hybrid coil.

6. A voice response system as defined in claim 2, wherein said analyzer means comprises at least one unit circuit comprising a signal input terminal, a delay element which is connected to said input terminal and which has a delay time equal to a sampling period of the signals being analyzed, correlation means for calculating the correlation coefficient between the output of said delay element and the input from said input terminal, first multiplier means for performing a multiplication between the output of said delay element and the output of said correlation means, first adder means for performing an addition between the output of said delay element and the output of said second multiplier means, and second adder means for performing an addition between the signal from said input terminal and the output of said second multiplier means.

7. A voice response system as defined in claim 6, wherein said inverse filter means comprises at least one unit circuit which corresponds to the unit circuit of said analyzer means with the correlation means removed, the output of said correlation means of said analyzer being connected to the first and second multiplier means of said inverse filter means 8. A voice response system as defined in claim 7, wherein said analyzer means and said inverse filter means each comprise between 2 and 6 unit circuit in cascade.

9. A voice response system as defined in claim 4, further including a buffer memory connected between said analyzer means and said inverse filter means.

10. A voice response system as defined in claim 4, wherein said push button telephone terminal generates push button signals consisting of a predetermined two out of a plurality of reference sine wave signals at voice frequencies.

11. A voice response system as defined in claim 10, wherein said push button receiver means includes two channels for receipt of said push button signals, the first channel having a high frequency band pass filter in cascade with an inverse filter means and a correlation means and a second channel having a low frequency band pass filter in cascade with an inverse filter means and a correlation detector means.

12. A voice response system as defined in claim 10, wherein said correlation detector means comprises a multiplier having one input receiving the output of said inverse filter means and a second input connected to the output of a shift register in which there is stored sample signals corresponding to one cycle of said reference sine wave signals, an accumulator connected to the output of said multiplier, a low pass filter connected to receive the output of said accumulator, and a threshold circuit connected to the output of said low pass filter.

13. A voice response system as defined in claim 10, wherein said correlation detector means comprises a plurality of correlation detectors each including a multiplier having one input receiving the output of said inverse filter means and a second input connected to the output of a common shift register in which there is stored sample signals corresponding to one cycle of said reference sine wave signals shifted every $\pi/2$, an accumulator connected to the output of said multiplier and a low pass filter connected to receive the output of said accumulator, the outputs of each correlation detector being connected to a respective input of a comparator whose output is connected to a threshold circuit.

14. A voice response system as defined in claim 10, wherein said correlation detector means comprises a plurality of detector channels each comprising a band pass filter having a respectively different center frequency, a correlation detector connected to the output of said band pass filter and a threshold circuit connected to the output of said correlation detector, and including a decoder having respective inputs connected to the threshold circuits of each detector channel.

15. A voice response system as defined in claim 1, wherein said interconnecting means includes a telephone switching network.

* * * * *